United States Patent [19]
Smith

[11] Patent Number: 6,113,338
[45] Date of Patent: Sep. 5, 2000

[54] REAR LOADING TRAILER AND METHOD OF USE

[76] Inventor: Francis V. Smith, P.O. Box 3487, Bozeman, Mont. 59772

[21] Appl. No.: 09/165,317

[22] Filed: Oct. 2, 1998

[51] Int. Cl.⁷ .......................................................... B60P 1/43
[52] U.S. Cl. .................. 414/482; 280/43.24; 280/6.151; 414/476; 414/480; 414/485; 414/537; 414/812
[58] Field of Search ...................................... 414/471, 474, 414/476, 480, 482, 483, 537, 812, 485; 280/43.17, 43.24, 414.5, 6.15, 6.151

[56] References Cited

U.S. PATENT DOCUMENTS

| | | | |
|---|---|---|---|
| 2,954,137 | 9/1960 | Ash .......................................... | 414/483 |
| 3,346,131 | 10/1967 | Lundell ................................... | 414/476 |
| 3,430,791 | 3/1969 | Moss ........................................ | 414/474 |
| 3,811,697 | 5/1974 | Armstrong . | |
| 3,927,775 | 12/1975 | Graupmann ............................. | 414/537 |
| 4,063,745 | 12/1977 | Olson ................................ | 280/43.24 X |
| 4,077,643 | 3/1978 | Bates . | |
| 4,730,974 | 3/1988 | Andre ....................................... | 414/483 |
| 4,792,274 | 12/1988 | Cockram ................................. | 414/537 |
| 4,902,188 | 2/1990 | Page ..................................... | 414/537 X |
| 5,161,814 | 11/1992 | Walker ............................. | 280/43.24 X |
| 5,560,639 | 10/1996 | Nowell et al. .................... | 280/43.17 X |

FOREIGN PATENT DOCUMENTS

| | | | |
|---|---|---|---|
| 2590530 | 5/1987 | France ..................................... | 414/480 |
| 2160832 | 1/1986 | United Kingdom ................... | 414/476 |

OTHER PUBLICATIONS

"200 Ton Lowboy" product brouchure from Mega Corp.
"Hydra–Scope" product brochure from Wilson.
"35 GSL/S + 35 GSL/BR" product brouchure from Eager Beaver.
"TBT Series" product brouchure from Talbert.
"Tag Trailers" product brouchure from Trail King.

*Primary Examiner*—James W. Keenan
*Attorney, Agent, or Firm*—Clark & Brody

[57] ABSTRACT

A rear loading trailer includes a rearward end lowering mechanism to eliminate or reduce unnecessary weighting of the rear wheels and axle during loading or unloading of heavy equipment such as mining earth movers, shovels and the like. The lowering mechanism lowers the rearward end of the trailer and a ramp associated therewith onto a ground surface. With the ramp and trailer end supported at grade, the trailer body and the ground support the weight of the equipment during initial loading/unloading rather than the axles and/or wheels, thereby avoiding possible damage to the wheels and axles. The ramp moves with the trailer end so that trailer lowering would cause the ramp to also lower to the ground.

18 Claims, 3 Drawing Sheets

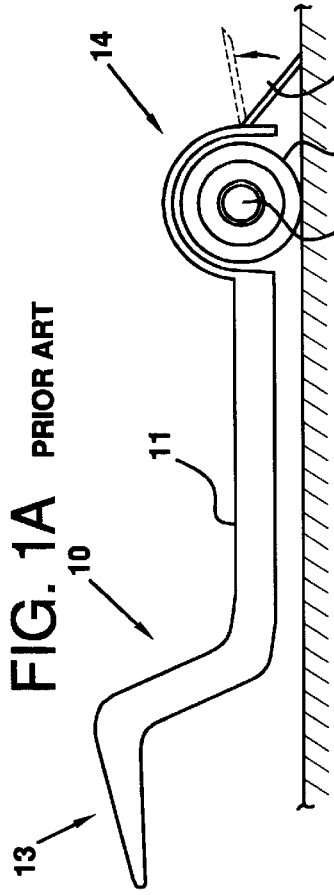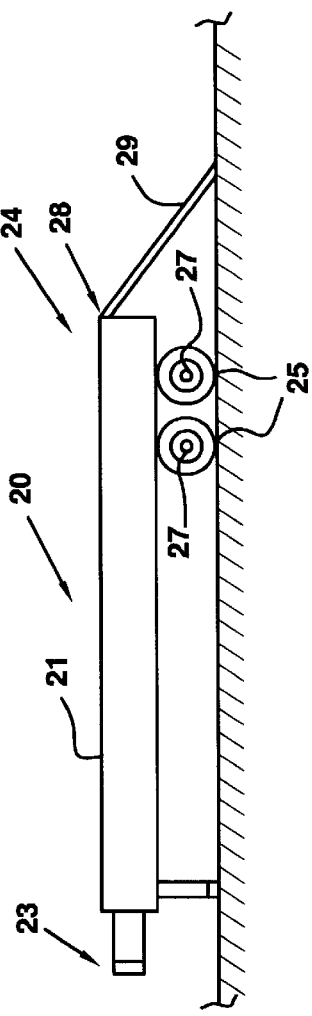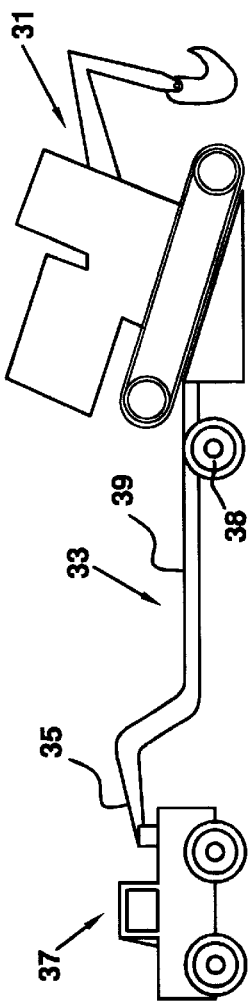

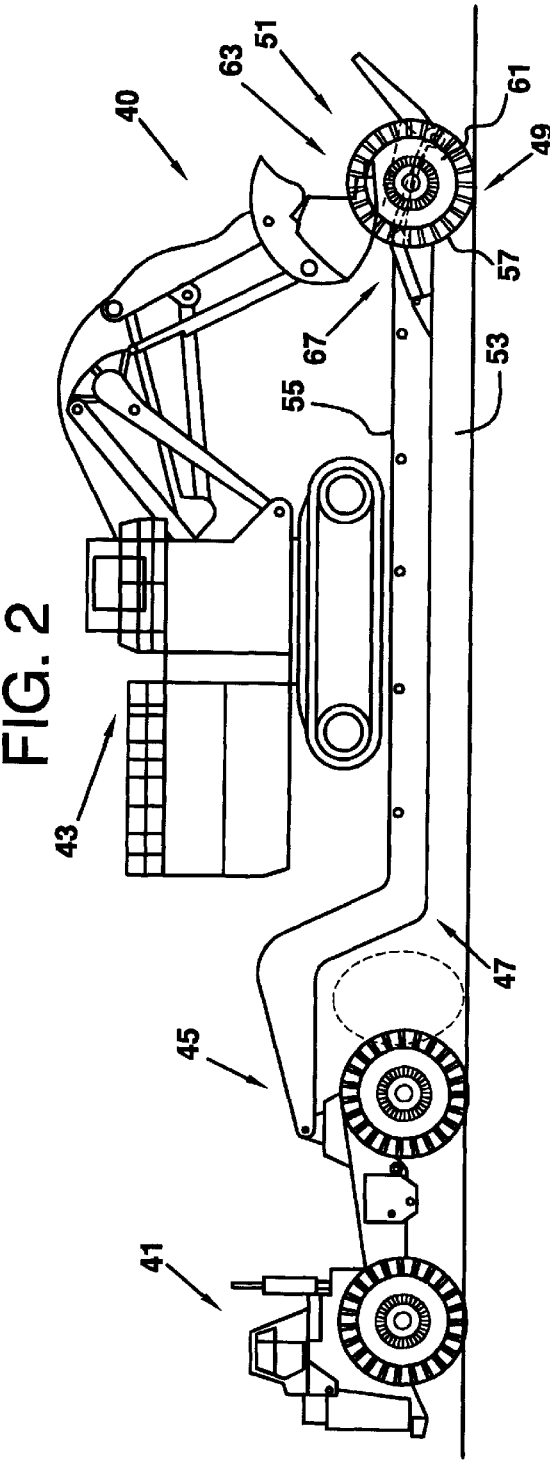
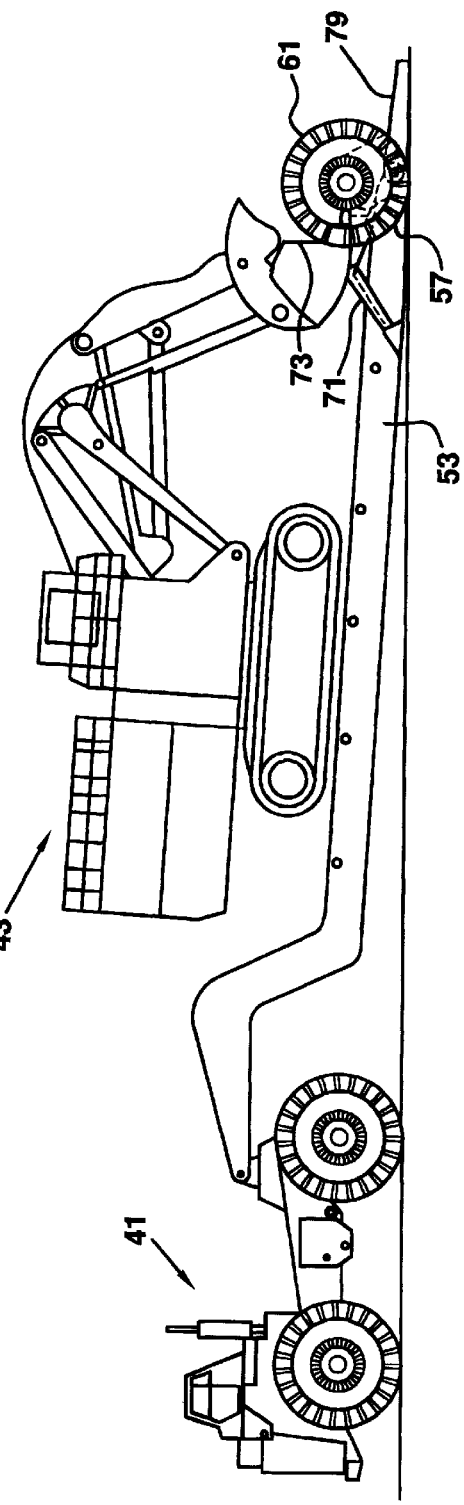

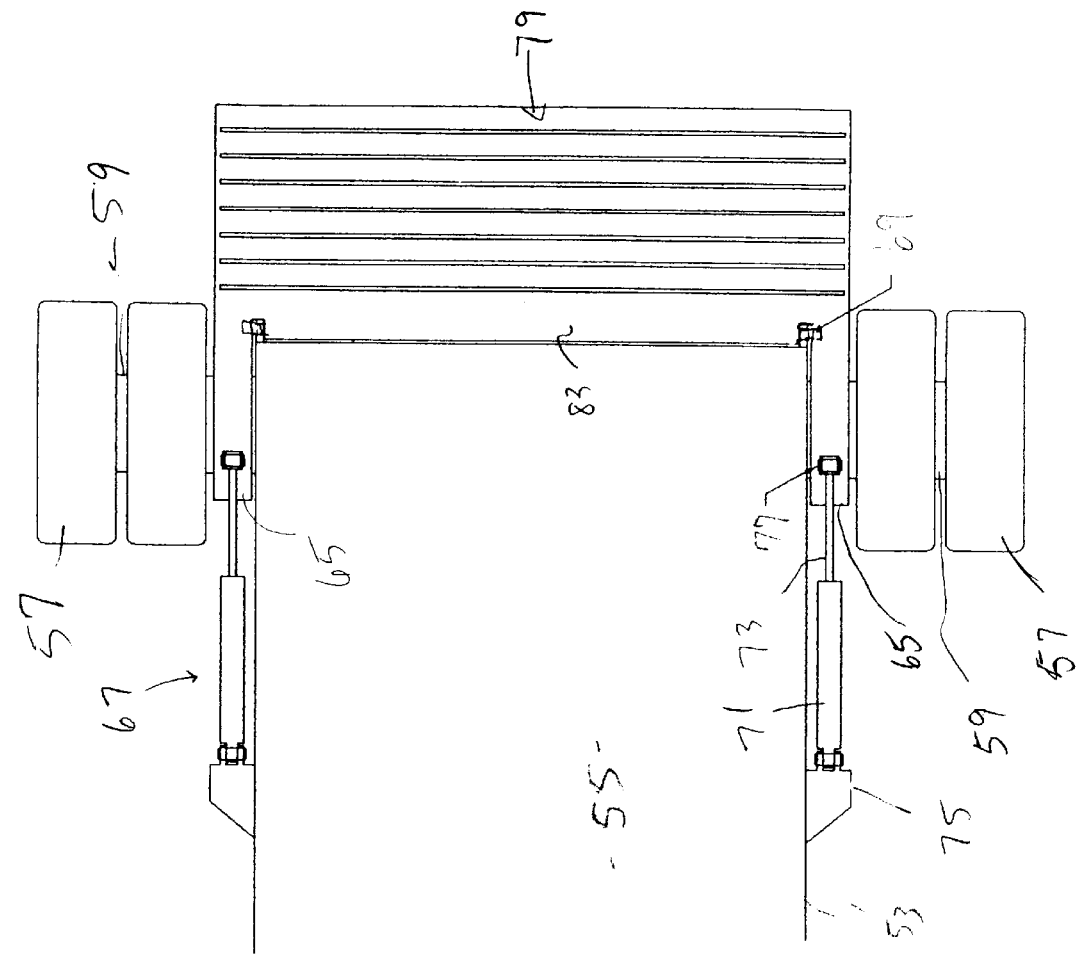

REAR LOADING TRAILER AND METHOD OF USE

FIELD OF THE INVENTION

The present invention is directed to a rear loading trailer and a method of use, and, in particular, to an off-the-road heavy equipment trailer having an rear loading mechanism which minimizes instability and axle overweighting when loading and/or unloading.

BACKGROUND ART

Various types of rear loading trailers have been proposed to facilitate the unloading and/or loading of equipment, particularly heavy equipment.

One type of trailer is designated by the reference numeral 10 in FIG. 1. This trailer represents an off-the-road heavy equipment trailer having a trailer body 11 and a gooseneck hitch 13, the hitch 13 designed to attach to a hauling vehicle. The rear end 14 of the trailer includes at least a pair of wheels 15 that are mounted on an axle 17. A ramp 19 permits loading or unloading of heavy equipment onto the trailer body 11. The ramp 19 can be raised using hydraulics or the like.

FIG. 2 illustrates a second type of rear end loading trailer designated by the reference numeral 20. This trailer has a trailer body 21, a trailer hitch 23, and two sets of rear wheels 25, each set mounted on axles 27. Rear loading of the trailer 20 is accomplished by attachment of a ramp 29 to the rear end portion 24 of the trailer. The ramp is connected at reference number 28 using conventional means.

The rear end loading trailers depicted in FIGS. 1A and 1B are not without their disadvantages. Referring now to FIG. 1C, a piece of heavy equipment 31 is illustrated being loaded onto a trailer 33. The trailer gooseneck 35 is shown attached to a hauling vehicle 37. During loading, the entire weight of the heavy equipment 31 is supported only by the rear axles and/or wheels 38. Only when the heavy equipment 31 is seated for traveling between the wheels 38 and gooseneck hitch 35 is the load distributed between the front and the back of the trailer. During this overloading, the rear tires can be overloaded up to 200% of their normal loading. Such overloading causes the tires to flatten out and can result in damage to the tires and/or axle. Moreover, depending on the height of the trailer, the ramps attached to the rear end have to be rather long to ensure a gradual ramp angle. Alternatively, as shown in FIG. 1B, the ramp angle may be steep due to a relatively short ramp, such a steep ramp angle contributing to instability during a loading or unloading procedure.

Trailers having vertical lift or drop frames have also been proposed in the prior art. U.S. Pat. No. 3,811,697 to Armstrong discloses a vertical lift trailer having a pair of ground engaging wheels on opposite sides of the frame. Each wheel has an axle and a supporting arm connected at one end to each axle respectively and extending forwardly therefrom. Means swingably connecting the other ends of the supporting arms to the frames are provided for swinging movement about the transverse axis thereby to shift the wheels between lowered and elevated positions relative to the frame. U.S. Pat. No. 4,077,643 to Bates discloses a utility trailer with a frame which may be lowered to ground level at both the front and rear portions of the trailer to permit easy access and to facilitate loading and unloading of heavy vehicles and other items. The trailer frame is attached to a u-shaped axle which, in turn, is connected to a wheel suspension support. The wheel suspension may be raised or lowered by rotation of the wheels' suspension about the axle allowing the rear of the trailer frame to be raised or lowered. The front of the trailer frame is connected to a cable controlled by a winch which will pivot for lowering or raising of the front part of the trailer frame. Locking pins are employed to lock the suspension and the front portion of the trailer frame in place during travel. Neither of these patents teach or suggest a mechanism for off-the-road trailers nor the utilization of a ramp in concert with a trailer body to facilitate loading/unloading.

In light of the deficiencies in prior art rear loading trailers, both off-the-road and on-road, a need has developed to provide an improved trailer. The present invention solves this needs with the development of a rear loading trailer having a mechanism which simultaneously provides ramp access to the trailer body while lowering the trailer body onto a ground surface. In this way, separate ramp manipulations or systems are eliminated.

SUMMARY OF THE INVENTION

Accordingly, it is a first object of the present invention to provide an improved rear loading trailer.

Another object of the present invention is to provide a rear loading trailer, particularly adapted for off-the-road use and heavy equipment.

A still further object of the present invention is a rear loading trailer employing a mechanism that allows for loading/unloading without putting undue weight or loads on the rear axle(s) or wheels of a trailer.

One other object of the present invention is a rear loading trailer that eliminates the need for steep ramp inclines when loading or unloading equipment from or onto a trailer bed.

Yet another object of the invention is a trailer that permits simultaneous moving of a trailer body and a ramp associated therewith for loading/unloading.

Other objects and advantages of the present invention will become apparent as a description thereof proceeds.

In satisfaction of the foregoing objects and advantages, the present invention provides a rear loading trailer that is capable of loading/unloading equipment, particularly heavy equipment, without undue stress or weighting of rear axles of the trailer. The invention accomplishes this aim by having a mechanism that lowers the rearward end of the trailer with respect to a front end of the trailer and translates the trailer body so that: (1) a ground surface and the trailer body support the equipment weight rather than the wheels or tires and axles of the trailer; and (2) ramp access is provided for loading/unloading at the same time that the trailer body rests on the ground surface.

In one embodiment, the inventive rear loading trailer comprises a trailer body having a hitch at a forward end and a wheel assembly mounted to a rearward end. Also included are means for lowering the rearward end of the trailer body and translating the wheels rearwardly so that equipment can be loaded on or unloaded off of the trailer body when in the lowered position.

The trailer includes a ramp as part of the lowering means, the ramp extending from the rearward end to facilitate equipment loading and unloading. Lowering of the trailer end also lowers the ramp to the ground surface.

The invention readily provides ramp access to a trailer bed as part of the trailer body movement, thereby eliminating the need for a separate ramp assembly or attachment of ramps to the trailer body.

One example of the lowering means includes a pair of plates which support the wheel assembly, the plates being either separable or integral with the ramp. The plates are designed to be driven so as to rotate about an axis of the wheel assembly to cause the trailer body to lower for equipment for loading and unloading. The plates can be driven by a piston assembly such as a hydraulic, electric or pneumatic type to affect trailer body lowering. The piston assembly can then raise the trailer once the loading/unloading procedure has completed.

The invention also includes a method of loading equipment onto a rear loading trailer, using the trailer described above. First, the rearward end of the trailer body is lowered and translated rearwardly. Equipment is then either loaded onto the trailer body or removed therefrom using a ramp extending from the rearward end. The ramp is associated with the plates so that it can be lowered or raised via movement of the plates.

The inventive rear loading trailer can be sized to travel on or off the road depending on the equipment to be hauled. The trailer is particularly adapted for extremely heavy mining equipment, such equipment weighing in excess of 100 tons.

BRIEF DESCRIPTION OF THE DRAWINGS

Reference is now made to the drawings of the invention wherein:

FIG. 1A is a schematic representation of a first type of a prior art trailer;

FIG. 1B is a schematic representation of a second type of a prior art trailer;

FIG. 1C shows a loading operation using a prior art rear loading trailer;

FIG. 2 is a side view of one embodiment of the invention showing a trailer in a travel position;

FIG. 3 is a side view of the FIG. 2 embodiment showing the inventive rear loading mechanism in the loading/unloading position;

FIG. 4 is a plan view of a portion of the trailer of FIG. 2; and

FIGS. 5A and 5B are schematic motion-indicating representations of the FIG. 2 embodiment of the rear loading mechanism of the invention.

DESCRIPTION OF THE PREFERRED EMBODIMENTS

The present invention offers significant improvements in the loading and unloading of equipment onto a trailer, particularly extremely heavy equipment. More particularly, the invention avoids the overweighting which commonly occurs during loading and unloading of equipment onto or off of a trailer using conventional means. Through a unique lowering mechanism associated with the trailer body, the uneven weight distribution experienced by trailers during loading/unloading is virtually eliminated. With the invention, a ground surface and the trailer body support the weight of the equipment rather than the wheels and/or axles of the trailer. Thus, possible or actual damage to the wheel assembly of the trailer is minimized or avoided entirely. At the same time, ramp access is provided, thereby avoiding the need for other ramp mechanisms or attachments The invention also facilitates the unloading or loading operation by eliminating the use of ramps at relatively steep angles for loading/unloading. With the trailer at ground level or grade, equipment can be easily moved on or off of the trailer body.

One embodiment of the invention is depicted in FIGS. 2–5B and is generally designated by the reference numeral 40. The rear loading trailer 40 is hauled by a vehicle 41 and is depicted supporting a piece of mining equipment 43. The trailer 40 has a gooseneck hitch 45 extending from a forward end 47 for attachment to the hauling vehicle 41.

The trailer 40 is commonly referred to as a "lowboy" trailer. Typically, the underside of the trailer hugs the ground and the trailer bed 55 lies in a plane between the ground surface and a parallel plane intersecting the axles supporting the trailer wheels. It should be understood that other types of trailers can utilize the invention, including those utilizing different hitches and trailer bodies that have the wheels extending therebeneath.

In addition, the invention can be used with both the off highway or off-the-road trailers such as that depicted in FIG. 2 or, alternatively, on trailers which can be hauled on publicly accessible highways. It is believed that the inventive mechanism facilitating the rear loading of equipment is adapted for both off-highway and on-highway trailer use.

The trailer 40 has a trailer body 53 that has a bed 55 to receive the equipment 43 during transit. The bed 55 can have decking or the like to support the equipment. Alternatively, the bed 55 can be a part of the body 53 itself.

A rearward end 51 of the trailer has a wheel assembly 49 which comprises wheels 57 mounted on axles 59, see FIG. 4. Each axle rotates about an axis 61, see FIG. 3. Although wheel pairs are illustrated in FIG. 4, other types of wheel assemblies can be employed as part of the invention, including those utilizing dual axles, a single wheel on each axle or combinations thereof.

The inventive trailer 40 also includes a mechanism 63 which facilitates loading and unloading of the equipment 43 by lowering and translating the trailer body 53. One embodiment of this mechanism is more clearly depicted in FIGS. 4, 5A and 5B. The mechanism 63 includes a pair of axle attachment plates 65. Each plate 65 supports a respective axle 59 on either side of the trailer body 53. The axle mounting to the plates 65 can be any type, e.g., welding, mechanical, combinations thereof or other conventional techniques. Each plate 65 is, in turn, supported between a piston assembly 67 and the rearward end 51 of the trailer at pivot pin 69. Each pin 69 is shown extending from the trailer body 53 and into each plate 65, but the pin 69 could also extend from the trailer into a ramp 79 as described below.

The piston assembly 67 comprises a hydraulic cylinder 71 with a piston 73 extending therefrom. The cylinder 71 is fixed at reference numeral 75 to the trailer body. The piston 73 is fixed to the plate 65 at reference numeral 77.

The mechanism 63 is also shown with the ramp 79 made as an integral part thereof. With the ramp integrally connected to the plate 65, movement of the plate, as will be described below, also causes the ramp 79 to move between a lowered position for loading/unloading or a raised position for trailer travel. However, if so desired, the ramp 79 could be made separable from the plate 65 but still appropriately linked to the plates for movement with the trailer lowering or raising.

While the piston assemblies 67, the axle attachment plate 65 and ramp 79 function to lower the trailer and provide a path for equipment travel, other means for accomplishing the functions described above can also be utilized as would be within the skill of the art. For example, other types of drives rather than the hydraulic cylinder 71 can be utilized. For example, a pneumatically or electrically powered drive or the like could be employed. Other cam mechanisms than the plates 65 could be employed to accomplish the trailer lowering and ramp pivoting.

FIGS. 2, 3, 5 and 5B more clearly depict the motion achieved by the mechanism for loading/unloading. Referring to FIGS. 2 and 5A, the trailer body 53 is depicted in the raised position. In this position, the piston 73 is retracted within the cylinder 71 and the ramp 79 is also in a raised position. In these drawings, reference numerals 75, 77 and 69 identify the points where movement occurs to most easily understand the function of mechanism 63.

Referring particularly to FIG. 5A, the axis 61 of the wheel assembly 49 remains fixed at distance X from grade 81.

In order to lower the trailer body 53, the piston 73 extends from the cylinder 71, thereby driving the axle attachment plate 65 and moving the point 77 upwardly and toward the rear of the trailer, see FIG. 5B. At the same time, since the wheels are supported by the axle plate 65, the axis 61 moves in direction Y, the wheel 67 also moving or rotating toward the rear of the trailer, see FIG. 5B. As can be seen comparing FIGS. 2 and 3, the wheel 57 is moved rearwardly from its FIG. 2 position when the piston 73 is extended.

At the same time that the axle attachment plate 65 is driven by the piston 73, the axle attachment plate 65 and ramp 79 pivot about point 69, with the point 69 traveling in the Z direction as shown in FIG. 5B (the piston 71 pivots about point 75). Since the ramp 79 is linked to the axle attachment plate 65, movement of the plate 65 cause the ramp 79 to pivot downwardly until it contacts grade 81 as shown in FIG. 5B. In other words, the axle attachment plates 65 function as a cam during their movement in that they rotate about one point (the axis 61 of the axles) with the one point being translated when the wheels 57 move.

Since the rearward end 51 of the trailer body 53 is linked to the axle attachment plates 65 at pivot points 69, movement of the pivot point 69 as a result of the travel of the wheels 57 and extension of the piston 73 causes the rearward end 51 of the trailer to lower towards the ground so that the equipment 43 can be unloaded from the trailer and does not unduly weight the wheel assembly 49, see FIG. 3. Once the equipment 43 is removed, the cylinder 73 can be retracted. Retraction of the cylinder 73 drives point 77 so that the axle attachment plate 65 rotates about the axis 61 of the wheel assembly 49 while the axis translates opposite of the Y direction. This movement causes the wheels 57 to travel towards the hauling vehicle 41, thereby raising the trailer body through movement of point 69 in the direction opposite of Z, and raise the ramp 79 until another loading operation is required. Although the movement of a single plate 65 is described, both plates 65 move for unloading/loading procedures.

It should be understood that the mechanism 63 depicted in the illustrated embodiment is but one example of lowering the trailer to facilitate loading/unloading. For example, the piston assembly 67 could be mounted at different locations on the trailer body 53 and the axle attachment plates 65 could be configured differently or mounted to the trailer body 53 in different fashions. That is, each pivot pin 69 could link to the inner portion 83 of the ramp rather than a portion of each of the axle attachment plates 65. Other modifications as would be within the skill of the art can also be employed to lower the rearward end 51 of the trailer body 53 and to translate the wheel assembly 49 for ramp movement.

The hitch 45 can be removable from the trailer. The trailer materials of construction are preferably steel, with the trailer bed covered by wooden decking. Of course other materials can be employed as would be within the skill of the artisan.

The inventions also is advantageous in that it reduces the time for loading/unloading equipment. First, using a rear loading trailer eliminates the need for unhooking or hooking of the trailer hitch. Second, eliminating hitching or unhitching also avoids incomplete hitching and the dangers associated therewith. Third, there is no need for carrying additional ramps or manipulating ramps during loading/unloading. Finally, as stated above, undesirable weighting of the wheel assembly is avoided as is loading/unloading operations using steeply-inclined ramps.

As such, an invention has been disclosed in terms of preferred embodiments thereof which fulfills each and every one of the objects of the present invention as set forth above and provides new and improved rear loading trailer and a method of use.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A rear loading trailer comprising:
   a) a trailer body having a hitch at a forward end and a wheel assembly at a rearward end;
   b) a rearward loading/unloading mechanism mounted at the rearward end further comprising:
      i) a pair of axle attachment plates, each axle attachment plate supporting at least one wheel of the wheel assembly;
      ii) a ramp positioned between the axle attachment plates and extending from a rear edge of the trailer body, the ramp linked to the axle attachment plates, the ramp and each axle attachment plate pivotally connected to the trailer body at a pivot point;
      iii) at least one drive mounted to the trailer body and connected at one end to one of the attachment plates to rotate the axle attachment plates about the pivot point, rotation about the pivot point with the trailer body in an inoperative position translating each wheel along a ground surface, lowering the trailer body, and pivoting the ramp with respect to the trailer body into an operative position.

2. The trailer of claim 1, wherein the drive is a piston assembly operatively connected between the trailer body and each axle attachment plate, movement of the piston rotating the axle attachment plates.

3. The trailer of claim 2, wherein the piston assembly is actuated using hydraulic, pneumatic or electric power.

4. The trailer of claim 2, wherein each said piston assembly is mounted to a side portion of the trailer body between the wheel assembly and the hitch.

5. The trailer of claim 1, wherein the trailer body is sized to travel on publicly accessible roads.

6. The trailer of claim 1, wherein the trailer body is sized as an off-the-road trailer.

7. The trailer of claim 1, wherein the wheel assembly further comprises at least one axle extending from each axle attachment plate and at least one wheel mounted on each axle, each wheel rotating to translate the trailer body during pivoting movement of each axle attachment plate.

8. The trailer of claim 1, wherein the ramp and each axle attachment plate are formed of one piece.

9. The trailer of claim 1, wherein the trailer body has pivot pins extending from each side thereof at the rearward end as said pivots point.

10. The trailer of claim 1, wherein the hitch is a gooseneck hitch.

11. A rear loading trailer comprising:
a) a trailer body having a hitch at a forward end and a wheel assembly and a ramp mounted to a rearward end, the ramp and a portion of the wheel assembly linked together, each of the ramp and the portion being attached to the trailer body at a pivot point;
b) means for lowering the rearward end of the trailer body and translating the wheels of the wheel assembly by pivoting the ramp and a portion of the wheel assembly about the pivot point so that equipment can be loaded on or unloaded off the trailer body when the ramp is in a lowered position.

12. The trailer of claim 11, wherein the means for lowering and translating includes a pair of plates supporting the wheel assembly and being connected to the ramp, rotation of the plates about the pivot point causing the ramp and trailer body to lower for equipment loading/unloading.

13. The trailer of claim 12, wherein the means for lowering and translating includes at least one piston assembly driving the pair of plates for rotation thereof and trailer body lowering.

14. The trailer of claim 11, wherein the hitch is a gooseneck hitch.

15. The trailer of claim 11, wherein the trailer body is sized to travel off road or on a publicly-accessible road.

16. A method of loading equipment onto a rear loading trailer comprising:
a) providing a rear loading trailer having a trailer body, a hitch on a forward end and a wheel assembly and ramp extending from a rearward end, the ramp and a portion of the wheel assembly linked together, each of the ramp and the portion being attached to the trailer body at a pivot point;
b) lowering the rearward end of the trailer body and translating the trailer body longitudinally by pivoting the ramp and the portion of the wheel assembly with respect to the trailer body so that a portion of the ramp reaches a ground surface; and
c) loading equipment onto the trailer body using the ramp extending from the rearward end.

17. The method of claim 16, wherein the lowering step uses hydraulic power.

18. The method of claim 16, wherein wheels of the wheel assembly rotate to translate the trailer body when the ramp is lowered.

* * * * *